US012378803B2

(12) United States Patent
Toliver

(10) Patent No.: US 12,378,803 B2
(45) Date of Patent: Aug. 5, 2025

(54) FLARED END SECTION ASSEMBLY AND METHOD OF MAKING SAME

(71) Applicant: Thermocore Products Ltd., Ravenna, OH (US)

(72) Inventor: Timothy R. Toliver, Macedonia, OH (US)

( * ) Notice: Subject to any disclaimer, the term of this patent is extended or adjusted under 35 U.S.C. 154(b) by 281 days.

(21) Appl. No.: 18/142,273

(22) Filed: May 2, 2023

(65) Prior Publication Data

US 2023/0358082 A1 Nov. 9, 2023

Related U.S. Application Data

(60) Provisional application No. 63/337,843, filed on May 3, 2022.

(51) Int. Cl.
*E03F 1/00* (2006.01)
*E05D 1/02* (2006.01)

(52) U.S. Cl.
CPC ................ *E05D 1/02* (2013.01); *E03F 1/001* (2013.01)

(58) Field of Classification Search
CPC .... E05D 1/02; E05D 1/04; E03F 1/001; E03F 3/04; E03F 7/06; E02F 1/003
See application file for complete search history.

(56) References Cited

U.S. PATENT DOCUMENTS

| | | | | |
|---|---|---|---|---|
| 929,514 A * | 7/1909 | Tenold et al. | B01D 35/147 137/527.6 |
| 10,174,468 B2 * | 1/2019 | Eby, Sr. | E03F 1/003 |
| 2008/0138156 A1 * | 6/2008 | Janesky | E04D 13/08 405/40 |
| 2020/0354941 A1 * | 11/2020 | Spires | E03F 1/003 |
| 2020/0354943 A1 * | 11/2020 | Spires | E03F 5/106 |
| 2023/0257984 A1 * | 8/2023 | Coppes | E03F 5/105 405/36 |

* cited by examiner

*Primary Examiner* — Benjamin F Fiorello
(74) *Attorney, Agent, or Firm* — Watts Law LLC; Samantha R Smart; John A. Yirga

(57) ABSTRACT

A FES assembly for use with a drainage pip is described herein. The FES assembly includes an inlet head wall portion, a tapered midsection coupled to the flared end portion, the tapered midsection extending from the inlet head wall portion to a flared end section. The inlet head wall portion defining a base wall spacing and coupling first and second lateral walls, a partially circular portion defined by the first and second lateral walls, and a coupling base portion extending along the base wall. First and second folding hinge arms are hingedly coupled to the first and second lateral walls, wherein the first and second folding hinge arms define first and second arced surfaces. The first and second hinge arms extend between an open position and a closed position, wherein in the closed position, the first and second arced surface align with the partially circular portion to define a portion of a circle greater than the partially circular portion.

20 Claims, 10 Drawing Sheets

FLARED END SECTION ASSEMBLY AND METHOD OF MAKING SAME

CROSS REFERENCE TO RELATED APPLICATION

The present application is a non-provisional application that claims priority under 35 U.S.C. § 119(e) to U.S. Provisional Application Ser. No. 63/337,843 entitled FLARED END SECTION ASSEMBLY AND METHOD OF MAKING SAME that was filed on May 3, 2022 with the United States Patent Office, the present application claims priority to said provisional application which is incorporated by reference in its entirety herein for all purposes.

TECHNICAL FIELD

The present invention relates to a flared end section (FES) assembly having a hinge, and more specifically, a FES assembly having a folding hinge and/or a living hinge and a built in coupling system.

BACKGROUND

It is desirable to have flared end sections that are efficiently stackable, structurally reinforced, and well manufactured. As illustrated in FIG. 1, typical flared end sections have a circular section that couples to a solid circular pipe, the circular section leads to a flared end section. Historically, difficulties in the manufacturing process of typical flared end sections have prevented certain structural reinforcements. Traditional methods of making the typical flared end sections involve forming a circular shape to connect to the solid circular pipe. This circular shape is formed from a flat sheet of plastic during a thermoforming process. Stretching of the sheet during the thermoforming process thins a wall thickness of the flat sheet of plastic. The circular section is prone to thinning due to the manufacturing process. Additionally, the typical flared end section experiences thinning of over 200% from a top to a bottom of the circular section of the flared end section.

This results in the need to have a wall thickness of the typical flared end sections that are overly thick in some locations to achieve the desired minimum wall thickness in other locations. To compensate for the thinning of the flat sheet of plastic, the flat sheet of plastic is oversized (e.g., made more thick to compensate for the thinning), which adds cost to the finished typical flared end section.

Further, the shape of the typical flared end sections prevents efficient stacking, increasing the cost of shipping. Based upon the shape and thickness of typical flared end sections, a large displacement during stacking is incurred due to a width of the circular section. The circular section of the typical flared end section does not allow vertical stacking. Therefore, each stacked typical flared end section is displaced by the width of the circular section of said flared end section. The displacement is measured from a top of a circular section to a base of the typical flared end section. As a result of this stacking displacement the typical flared end sections become uneconomical for shipping.

Attaching the flared end section to a round pipe necessitates costly plastic threaded rods which connects two ends of the circular shape of the flared end section to each other. These threaded plastic rods are prone to breakage and take additional time to bolt into place. Typically, once flared end section is coupled to the round pipe, soil and backfilled soil is placed around the flared end section. Soil pressure acts laterally to sides of the flared end section sides, which often displace or buckle side walls of a typical flared end section. The traditional manufacturing process of the flared end section does not allow for ribs or stiffeners without creating "undercut", which adds difficult to removing the traditional flared end section from various molds.

SUMMARY

One example embodiment of the present disclosure includes a flared end section (FES) assembly. The FES assembly including an inlet head wall portion, the inlet head wall portion defining a base wall spacing and coupling first and second lateral walls, a partially circular portion defined by the first and second lateral walls, and a coupling base portion extending along the base wall. The FES assembly further including a tapered midsection coupled to the inlet head portion, the tapered midsection extending from the inlet head wall portion to a flared end section. The FES assembly additionally including first and second folding hinge arms hingedly coupled to the tapered midsection, wherein the first and second folding hinge arms define first and second arced surfaces, the first and second hinge arms having an open position and a closed position, wherein in the closed position, the first and second arced surface align with the partially circular portion to define a portion of a circle greater than the partially circular portion.

Another example embodiment of the present disclosure includes a flared end section (FES) assembly having an inlet head wall portion, the inlet head wall portion defining a base wall spacing and coupling first and second lateral walls, a partially circular portion defined by the first and second lateral walls and a coupling base portion extending along the base wall. The FES assembly further includes a tapered midsection coupled to the inlet head wall portion, the tapered midsection extending from the inlet head wall portion to a flared end section, and a first folding hinge arm hingedly coupled to the tapered midsection, wherein the first folding hinge arm defines a first arced surface, the first folding hinge arm having an open position and a closed position, wherein in the closed position, the first arced surface aligns with the partially circular portion to define a portion of a circle greater than the partially circular portion.

Yet another example embodiment of the present disclosure includes a method of making a flared end section (FES) assembly. The method comprising forming a polymer into an inlet head wall portion, the inlet head wall portion defining a base wall spacing and coupling first and second lateral walls, a partially circular portion defined by the first and second lateral walls, and a coupling base portion extending along the base wall. The method further comprising forming a tapered midsection coupled to the inlet head wall portion, the tapered midsection extending from the flared end portion to a flared end section, and forming first and second folding hinge arms hingedly coupled to the tapered midsection, wherein the first and second folding hinge arms define first and second arced surfaces, the first and second hinge arms having an open position and a closed position, wherein in the closed position, the first and second arced surface align with the partially circular portion to define a portion of a circle greater than the partially circular portion.

BRIEF DESCRIPTION OF THE DRAWINGS

The foregoing and other features and advantages of the present invention will become apparent to one skilled in the art to which the present invention relates upon consideration of the following description of the invention with reference to the accompanying drawings, wherein like reference numerals refer to like parts unless described otherwise throughout the drawings and in which.

DETAILED DESCRIPTION

Figure 1:
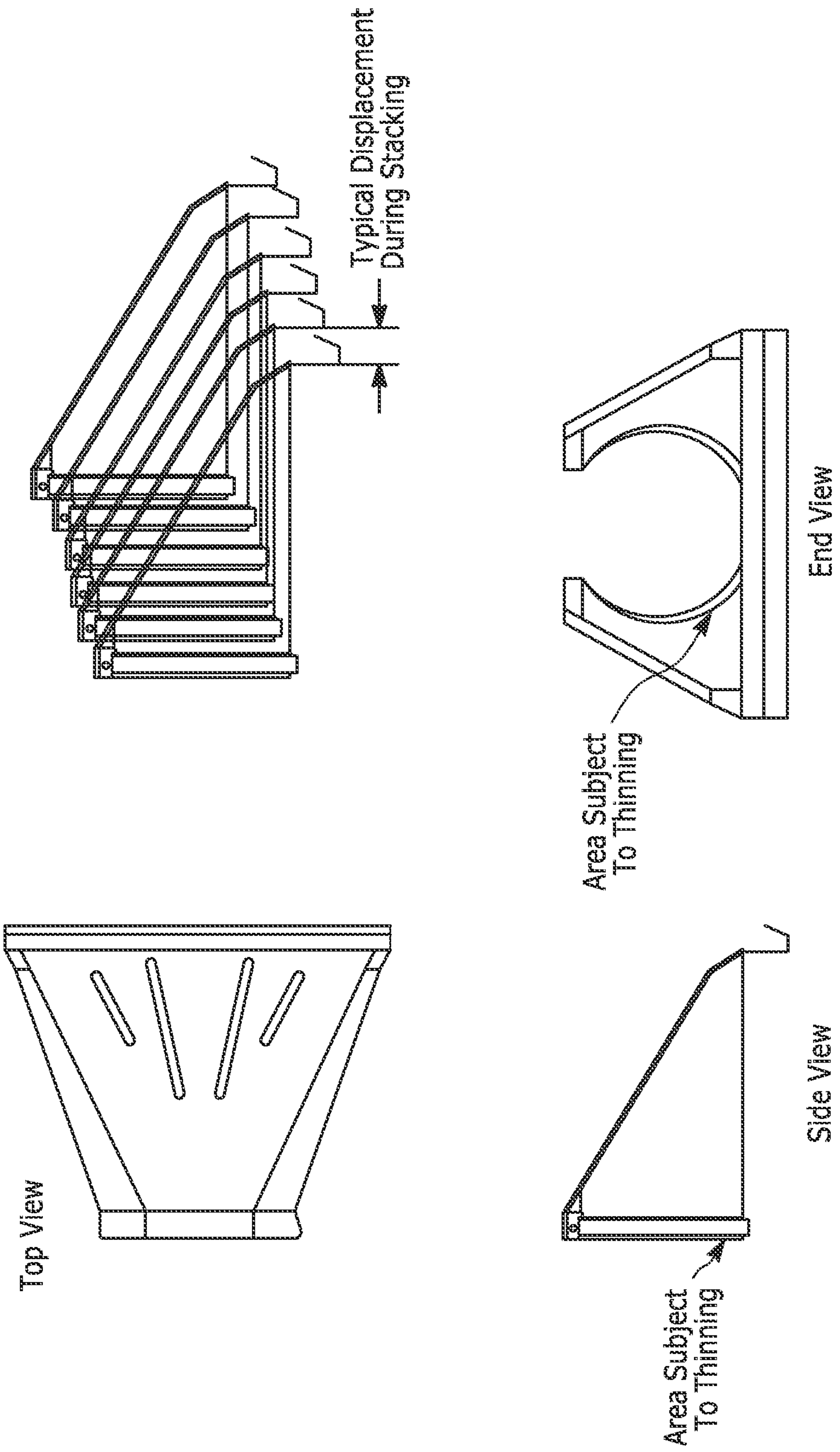
(Prior Art) FIG. 1
FIG. 1 is prior art FES assemblies.

The present invention relates to a FES assembly having a folding hinge, and more specifically, a FES assembly having a folding hinge and a built in coupling system.

Referring to the figures, and in particular FIGS. 2-7, which are views of a FES assembly 100 constructed in accordance with one embodiment of the disclosure. The FES assembly 100 includes an inlet head wall portion 102 defining a partially circular portion 112. The inlet head wall portion 102 is coupled to a flared end section 142 by a tapered midsection 122.

In one example embodiment, the inlet head wall portion 102 is coupled to a discharge end of storm sewer pipe(s) (not shown) to minimize the naturally occurring erosion and scouring effect of the stormwater discharge. The FES assembly 100 is made of one of High Density Poly Ethylene (HDPE) or Flame-resistant HDPE. In one example embodiment, the FES assembly 100 is made of a polymer, such as a polymer that meets the mining safety flammability criteria. Typical diameters of the partially circular portions 112 size range between 4" and 60", however, it would be understood by one of ordinary skill in the art that a manufacturing process described herein will make larger or smaller partially circular portions.

In one example embodiment, the inlet head wall portion 102 supports first and second folding hinge arms 104, 108. In one example embodiment, the first and second folding hinge arms 104, 108 are coupled the inlet head wall portion 102 by first and second hinges 106, 110, respectively. In one example embodiment, the first and second folding hinge arms 104, 108 are formed by molding, thermoforming, injection molding, and/or extruding. In one example embodiment, the inlet head wall portion 102, the tapered midsection 122, and the flared end section 142 are formed from a single sheet of plastic. In this example embodiment, the formation of the partially circular portion 112 causes the thermoforming of the single sheet of plastic to stretch less and thereby thins the sheet of plastic less than if a typical circular shaper were being formed.

In the illustrated example embodiment, the inlet head wall portion 102 includes a base wall 114 that defines a coupling base portion 114*a*. As illustrated in the example embodiment of FIG. 7, the coupling base portion 114*a* resides within a corrugation of a pipe 300. This increases the ease of coupling the inlet headwall portion 102 to the pipe 300. In the illustrated example embodiment of FIG. 4, the base wall 114 extends from the coupling base portion 114*a* to a tapered base wall 126 through the tapered midsection 122 to the flared end section 142. The inlet head wall portion 102 supports first and second lateral walls 116, 118, the first and second lateral walls coupled together and spaced by the base wall 114 and the tapered base wall 126. In one example embodiment the first and second lateral walls 116, 118 and the base wall 114 are substantially arced in the inlet head wall portion 102. The first and second lateral walls 116, 118 extend from the inlet head wall portion 102 to the flared end section 142, wherein the first and second lateral walls are spaced by the tapered base wall 126 through the tapered midsection 122. In one example embodiment, the first and second lateral walls 116, 118 and tapered base wall 126 are substantially linear through the tapered midsection 122. The first and second lateral walls 116, 118 terminate at or near the flared end section 142. The flared end section 142 terminates in a flared lip 144.

In one example embodiment, the first and second lateral walls 116, 118 support the first and second folding hinge arms 106, 110. In another example embodiment, the first and second lateral walls 116, 118 terminate in first and second top walls 120, 121. In one example embodiment, the first and second top walls 120, 121 are planar surfaces. In one example embodiment, the first and second top walls 120, 121 are opposite the base wall 114. In one example embodiment, the first and second top walls 120, 121 define a plane that extends along a first axis (FA), wherein the base wall 114 and/or the tapered base wall 126 extends along the first axis. The first axis FA extends between the first and second lateral walls 116, 118. In one example embodiment, the first and second top walls 120, 121 connect the first and second lateral walls 116, 118 to the partially circular portion 112.

Figure 2:
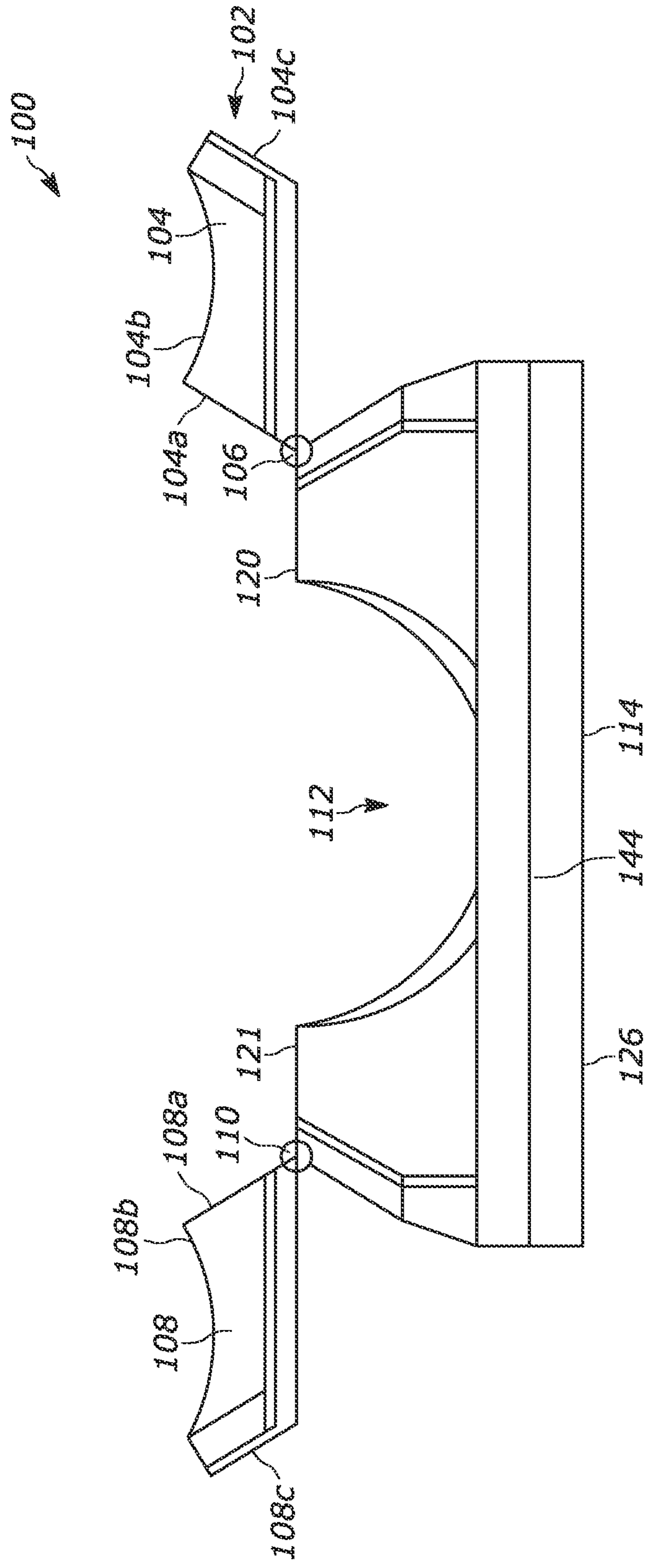
FIG. 2 is a rear view of a FES assembly in a partially open position, in accordance with one embodiment of the present disclosure.
Figure 3:
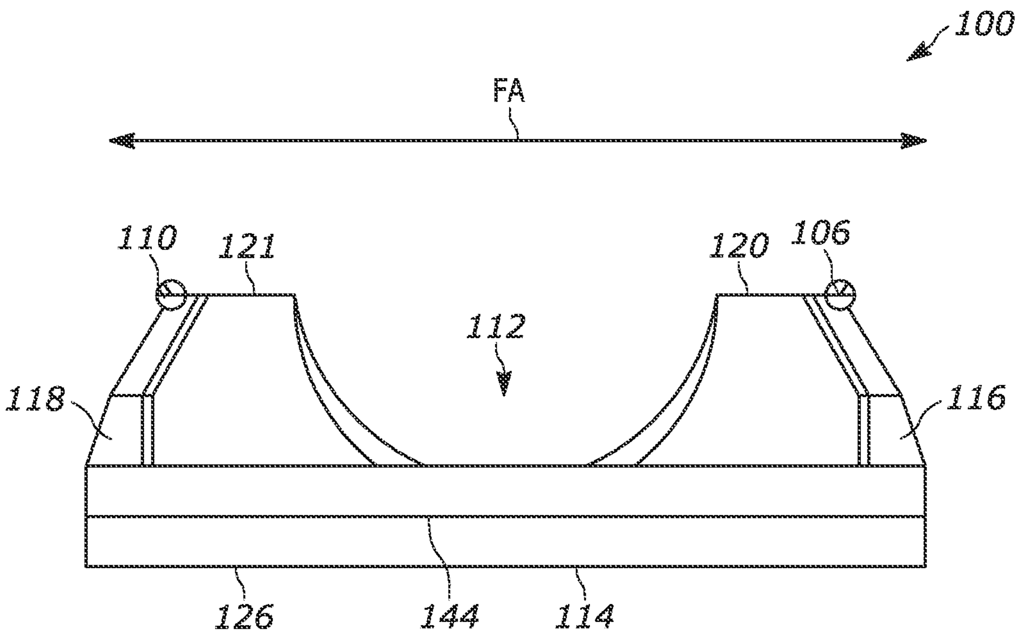
FIG. 3 is a rear view of a FES assembly with hinge portions omitted, in accordance with one embodiment of the present disclosure.
Figure 4:
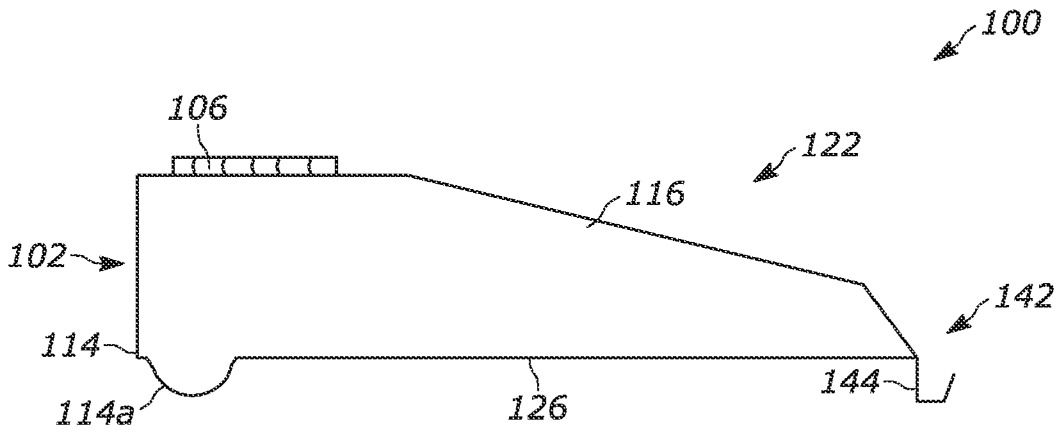
FIG. 4 is a left side view of FIG. 3.
Figure 5:
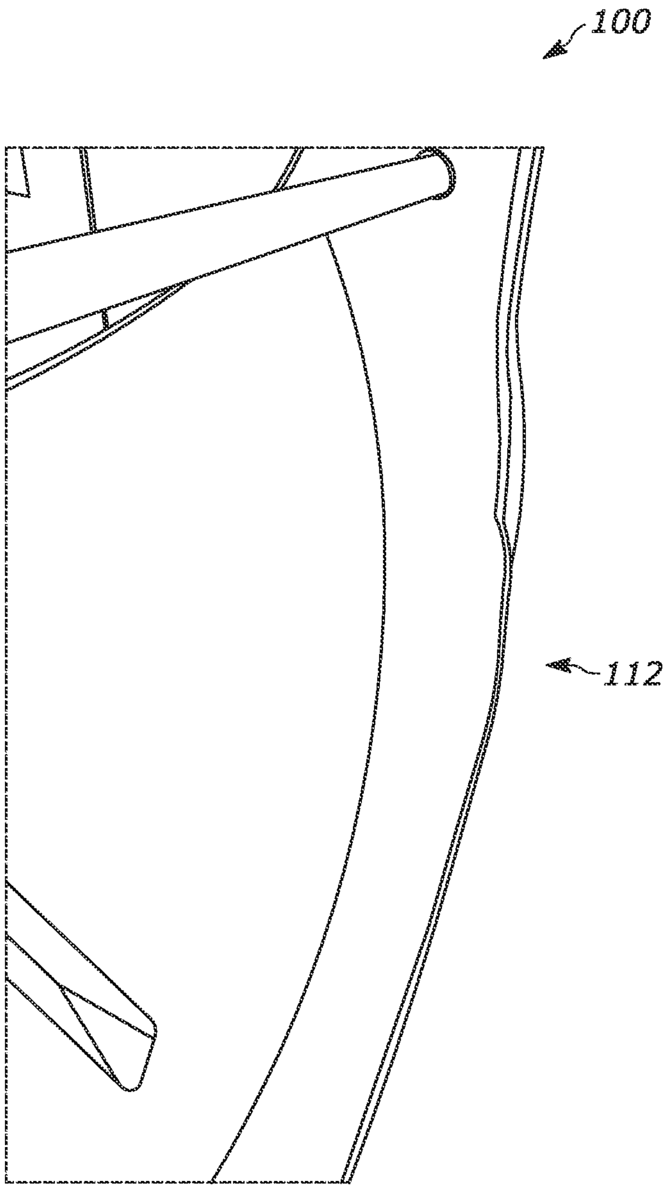
FIG. 5 is a partial sectional-side view of a FES assembly constructed in accordance with the present disclosure.

In the illustrated example embodiment of FIG. 2, the first and second folding hinge arms 104, 108 define first and second hinge surfaces 104*a*, 108*a*, first and second arced surfaces 104*b*, 108*b*, and first and second top surfaces 104*c*, 108*c*. In one example embodiment, the first and second hinge surfaces 104*a*, 108*a* define a planar surface. In one example embodiment, the first and second hinge surfaces 104*a*, 108*a* interface with the first and second top walls 120, 121 when the first and second folding hinge arms 104, 108 are in a closed position. Responsive to the FES assembly 100 being in the closed position, the first and second hinge surfaces 104*a*, 108*a* interface with the first and second top walls 120, 121 and define a plane that extends along the first axis FA. Responsive to being in an open position, the first and second hinge surfaces 104*a*, 108*a* are spaced from the first and second top walls 120, 121 and extend along the first axis FA, such that the first and second hinge surfaces and the first and second top walls define a flat surface for vertical stacking.

In one example embodiment, responsive to the FES assembly 100 being in the closed position, the first and second arced surfaces 104*b*, 108*b* align with the partially circular portion 112 to define a greater portion of a semi-circle than the partially circular portion alone. In one example embodiment, the first and second arced surfaces 104*b*, 108*b* in the closed position and the partially circular portion 112 define a semi-circle or a semi-oval. In one example embodiment, the first and second arced surfaces 104*b*, 108*b* in the closed position and the partially circular portion 112 form a complementary shape to the pipe 300. In one example embodiment, responsive to the FES assembly 100 being in the closed position, the first and second top surfaces 104*c*, 108*c* define a plane that extends along the first axis FA. In another example embodiment, responsive to the FES assembly 100 being in the closed position, the first and second top surfaces 104*c*, 108*c* define surfaces facing opposite the base wall 114.

Referring to the figures, and in particular FIGS. 8-12, which are views of a FES assembly 200 constructed in accordance with a second embodiment of the disclosure. The FES assembly 200 in FIGS. 8-12 is substantially similar to the FES assembly 100 illustrated in FIGS. 2-7 with shared features being identified by the same numeral increased by 100, non-shared features are described. The FES assembly 200 includes an inlet head wall portion 202 defining a partially circular portion 212 in a closed position (see FIG. 12). The inlet head wall portion 202 is coupled to a flared end section 242 by a tapered midsection 222.

In one example embodiment, the inlet head wall portion 202 and the tapered midsection 222 support first and second folding hinge arms 204, 208. In one example embodiment, the first and second folding hinge arms 204, 208 are coupled to the inlet head wall portion 202 and the tapered midsection 222 by first and second living hinges 206, 210, respectively. In one embodiment, the first and second living hinges 206, 210 are thinned and/or cut to allow rigid portions to bend along one or more lines of the hinges.

In one example embodiment, the first and second folding hinge arms 204, 208, the inlet head wall portion 202, the tapered midsection 222, and the flared end section 242 are formed by molding, thermoforming, injection molding, and/or extruding. In one example embodiment, the first and second folding hinge arms 204, 208, the inlet head wall portion 202, the tapered midsection 222, and the flared end section 242 are formed from a single sheet of plastic. In this example embodiment, the formation of the partially circular portion 212 and the first and second living hinges 206, 210 causes the thermoforming of the single sheet of plastic to stretch less and thereby thins the sheet of plastic less than if a typical circular shaper were being formed.

In the illustrated example embodiment of FIGS. 8-12, the first and second folding hinge arms 204, 208 define first and second hinge surfaces 204*a*, 208*a*, first and second arced surfaces 204*b*, 208*b*, and first and second top surfaces 204*c*, 208*c*. In one example embodiment, the first and second hinge surfaces 204*a*, 208*a* are contiguous with the first and second living hinges 206, 210, respectively. In one example embodiment, the first and second living hinges 206, 210 define a flat section (e.g., the first and second hinge surfaces 204*a*, 208*a*) of the first and second folding hinge arms 204, 208 which minimizes geometric features which inhibit articulation of the first and second arced surfaces 204*b*, 208*b* from folding into the closed position.

In the illustrated example embodiment of FIGS. 8-12, the inlet head wall portion 202 includes a base wall 214 that defines a coupling base portion (not shown). The inlet head wall portion 202 and the tapered midsection 222 support first and second lateral walls 216, 218 via the first and second living hinges 206, 210, the first and second lateral walls movably coupled together and spaced by the base wall 214 and the tapered base wall 226. In one example embodiment the first and second lateral walls 216, 218 and the base wall 214 are substantially arced through the inlet head wall portion 202. In one example embodiment, the first and second lateral walls 216, 218 extend between the inlet head wall portion 202 to the flared end section 242, wherein the first and second lateral walls are spaced by the tapered base wall 226 through the tapered midsection 222.

In one example embodiment, the first and second lateral walls 216, 218 and tapered base wall 226 are substantially linear through the tapered midsection 222. In another example embodiment, the first and second lateral walls 216, 218 are arced through the tapered midsection 222 and the tapered base wall 226 is substantially linear through the tapered midsection 222. The first and second lateral walls 216, 218 terminate at or near the flared end section 242. In one example embodiment, the first and second lateral walls 216, 218 terminate at or near first ends 206*a*, 210*a*, respectively, of the living hinges 206, 210. The first ends 206*a*, 210*a* nearer the flared end section 242 and opposite second ends 206*b*, 210*b*. The second ends 206*b*, 210*b* nearer the inlet head wall portion 202. In one example embodiment, the flared end section 242 terminates in a flared lip 244. In another example embodiment, the flared end section 242 omits the flared lip 244.

In one example embodiment, the first and second hinge surfaces 204*a*, 208*a* interface via the live hinges 206, 210 with first and second tapered wall ends 220, 221 of the tapered base wall 226. Responsive to the FES assembly 200 being in the closed position, the first and second hinge surfaces 204*a*, 208*a* are transverse or parallel to the first and second tapered wall ends 220, 221. Responsive to being in an open position, the first and second hinge surfaces 204*a*, 208*a* are spaced from the first and second tapered wall ends 220, 221 by an extended first and second live hinges 206, 210 (see FIG. 10). Responsive to the FES assembly 200 being in the open position, the first and second hinge surfaces 204*a*, 208*a* are parallel to the first and second tapered wall ends 220, 221. In another example embodiment, the first and second hinge surfaces 204*a*, 208*a* abut the first and second tapered wall ends 220, 221, wherein the first and second living hinges 206, 210 comprise a pivot point between the hinge surfaces and tapered wall ends.

In another example embodiment, the first and second lateral walls 216, 218 connect to the tapered base wall 226 via the live hinges 206, 210 at first and second tapered wall ends 220, 221. In one example embodiment, first and second tapered wall ends 220, 221 are linear. In one example embodiment, the first and second tapered wall ends 220, 221 are supported by the base wall 214 and the tapered base wall 226. In one example embodiment, the first and second tapered wall ends 220, 221 connect the first and second lateral walls 216, 218 to the partially circular portion 212.

Figure 9:
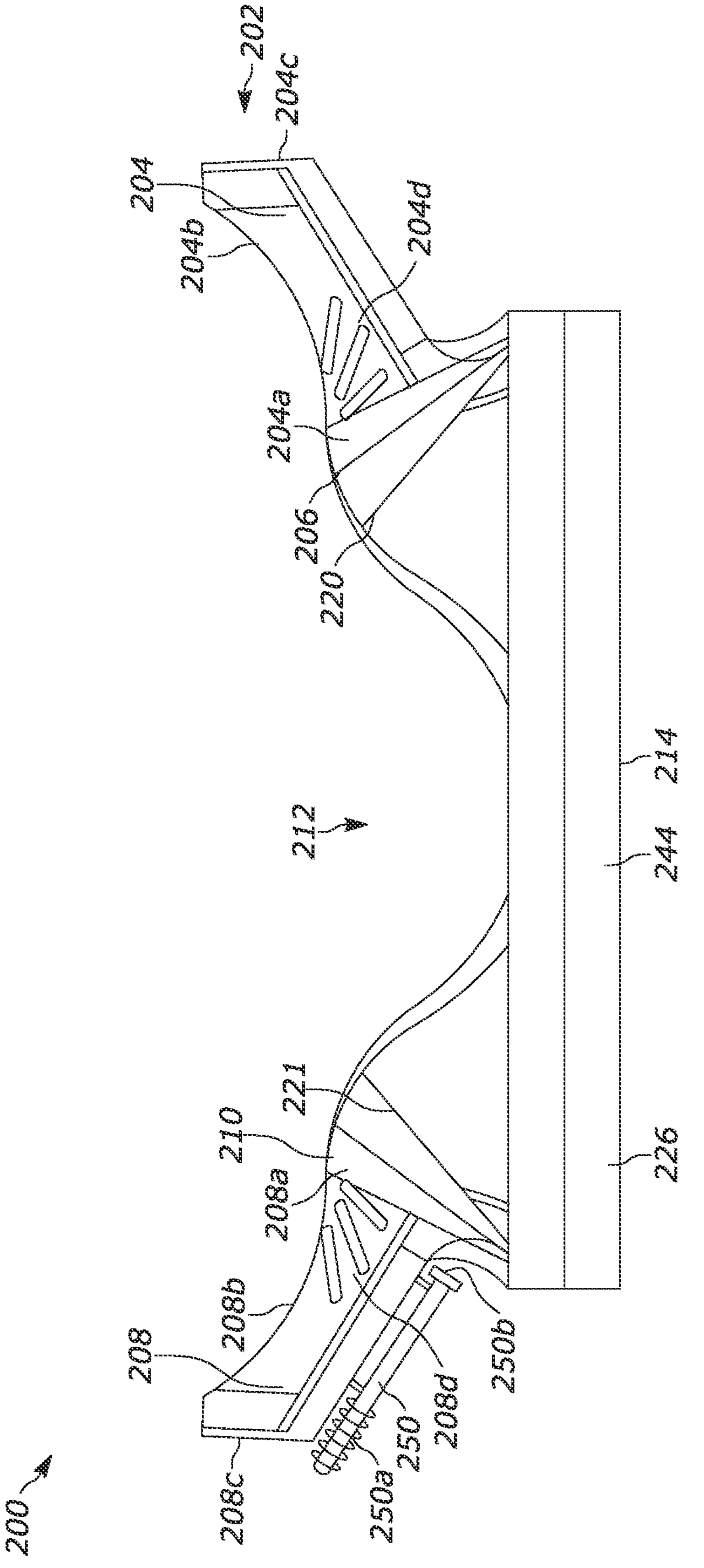
FIG. 9 is a rear view of a FES assembly in a partially open position, in accordance with a second embodiment of the present disclosure.
Figure 10:
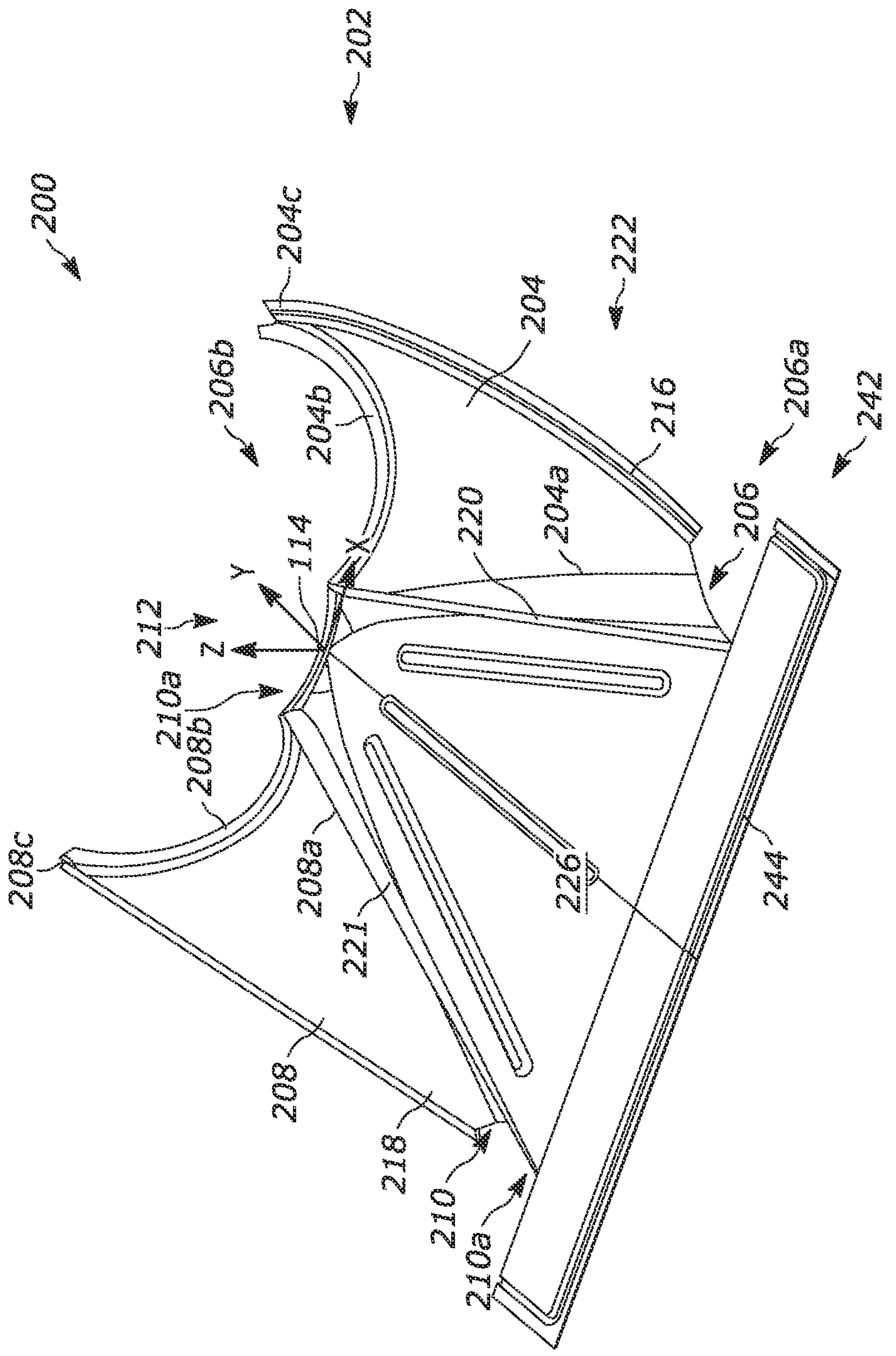
FIG. 10 is a top perspective view of a FES assembly in an open position, in accordance with a second embodiment of the present disclosure.
Figure 11:
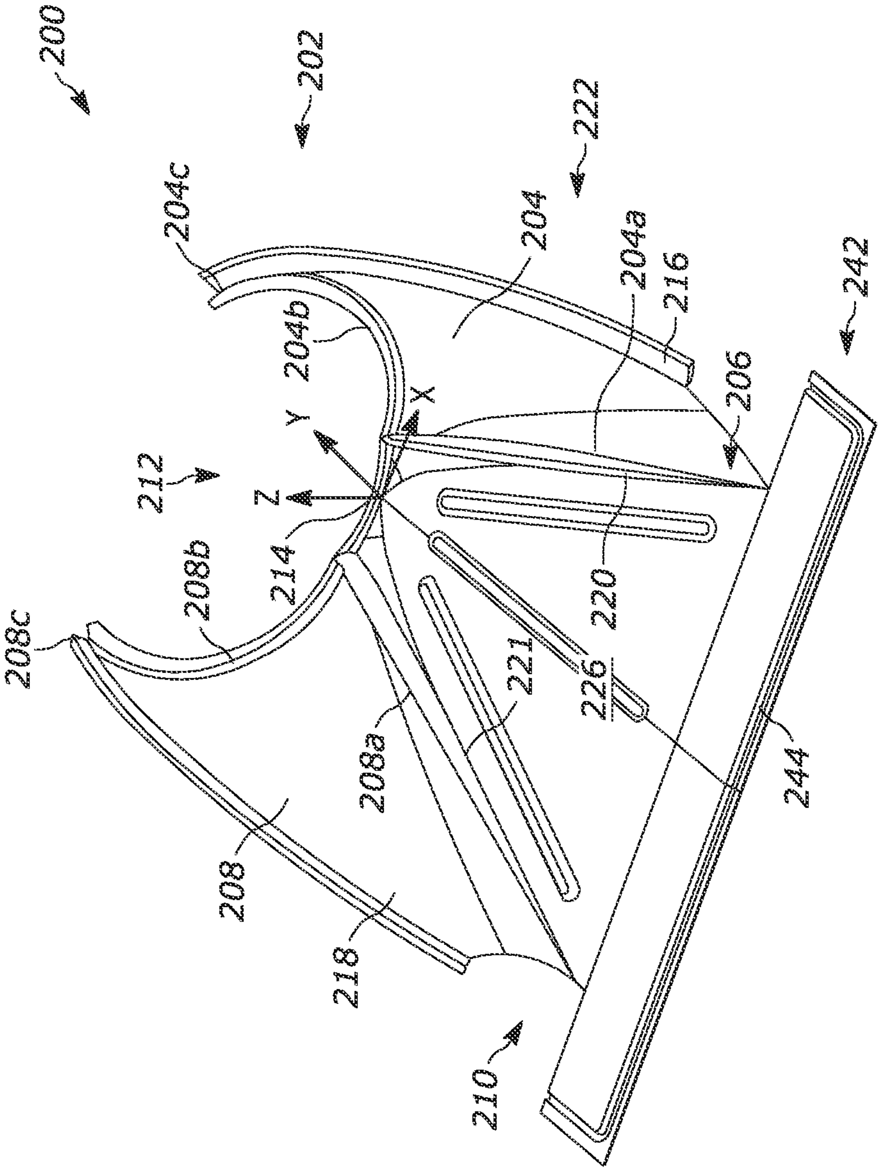
FIG. 11 is a top perspective view of a FES assembly in a partially open position, in accordance with a second embodiment of the present disclosure.
Figure 12:
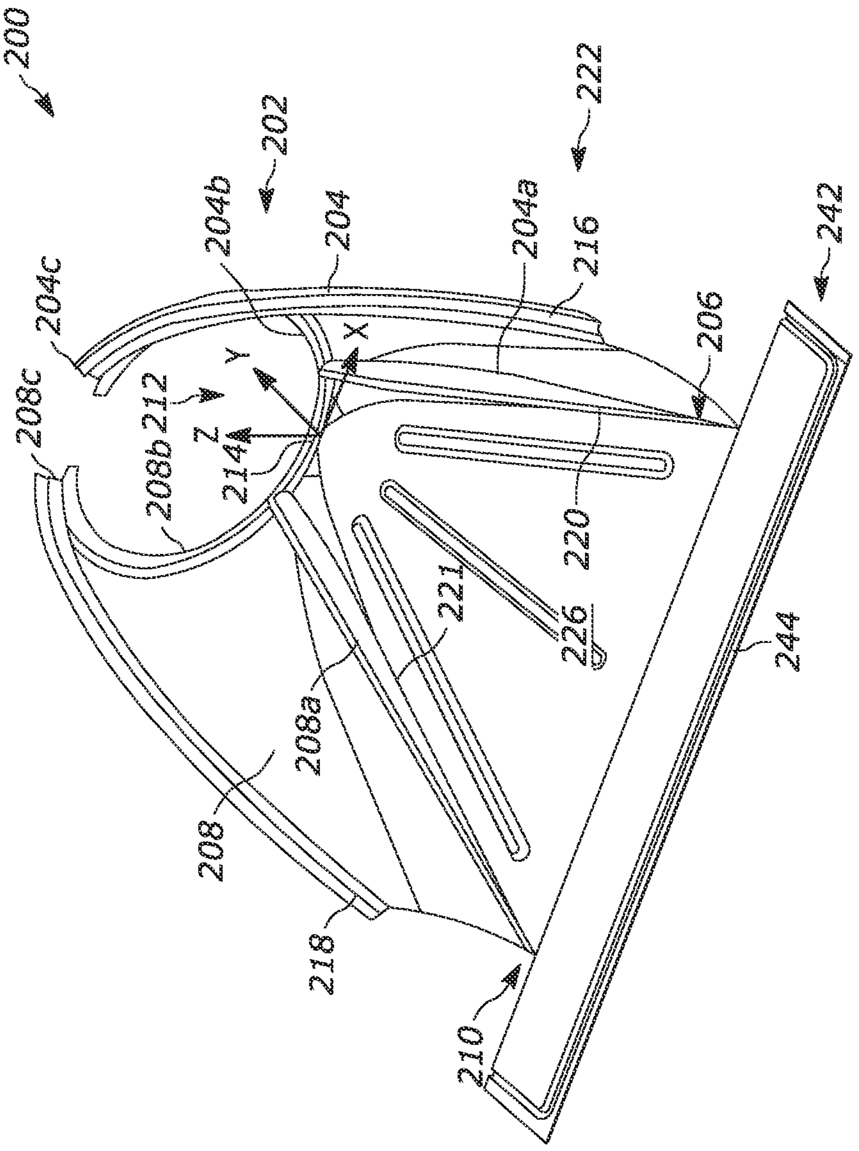
FIG. 12 is a top perspective view of a FES assembly in a closed position, in accordance with a second embodiment of the present disclosure.

As shown in the illustrated embodiment of FIG. 9, the first and second lateral walls 216, 218 define ribs and/or corrugations 204*d*, 208*d*, which provides lateral stiffness while allowing the articulation of the first and second folding hinge arms 204, 208, and thus the arced surfaces 204*b*, 208*b*. In one example, an angle of the ribs and/or corrugations 204*d*, 208*d* relative the centerline of the living hinges 206,

210 maintains a shape of the inlet head wall portion 202 in the closed position (see FIG. 12). In one example embodiment, the movement of the first and second living hinges 206, 210 fashion a bellowed hinge. In another example embodiment, the bellowed hinge 206, 210 include a pivot point at one end in which the collapsing of the hinges 206, 210 rotate. As shown in the illustrated embodiment of FIG. 6, a stiffener location 141 which allows the first and second lateral walls 216, 218 to articulate without deformation of a shape of lateral wall in the closed position. Essentially, in this example embodiment, the stiffener location 141 is orientated such that an axis 143 of the stiffener is projected or extended towards a hinge point of the living hinges 206, 210 in the tapered wall ends 220 and 221 (+/10 degrees).

Figure 8:
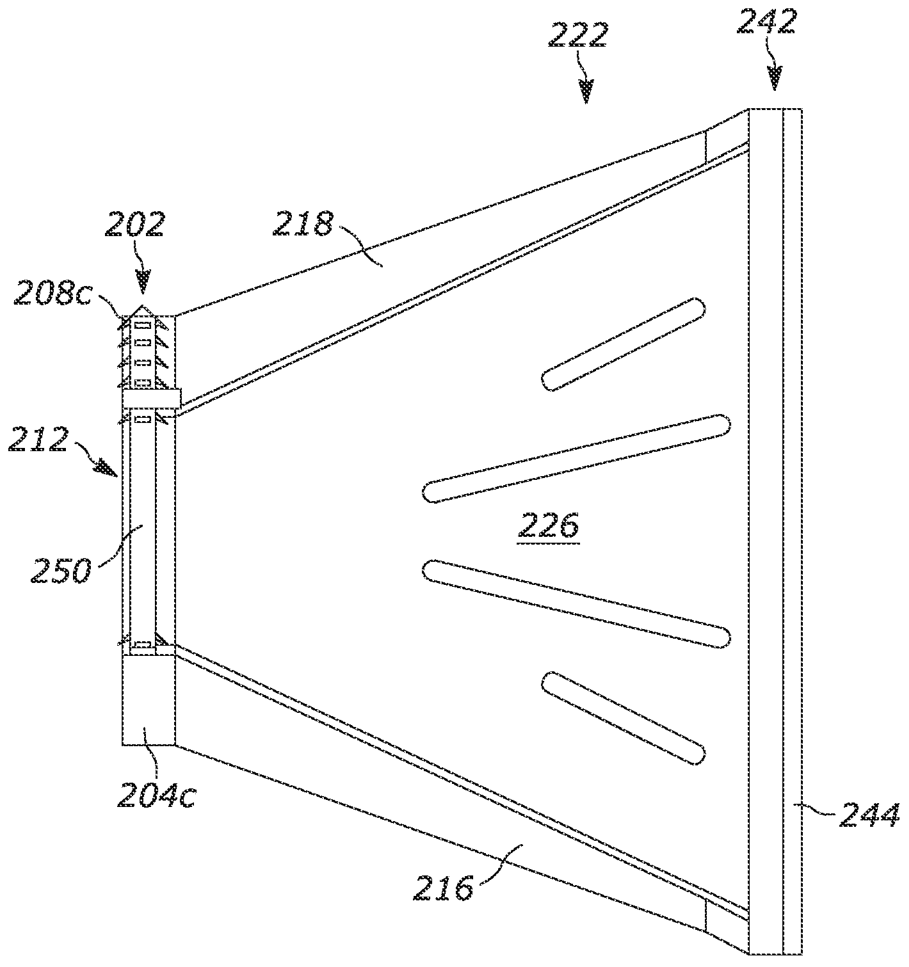
FIG. 8 is a top view of a FES assembly in a closed position, in accordance with a second embodiment of the present disclosure.

As illustrated in the example embodiments of FIGS. 8 and 12, responsive to the FES assembly 200 being in the closed position, the first and second arced surfaces 204*b*, 208*b* align with the partially circular portion 212 to define a greater portion of a semi-circle than the partially circular portion alone. In one example embodiment, the first and second arced surfaces 204*b*, 208*b* in the closed position and the partially circular portion 212 define a semi-circle or a semi-oval, wherein the first and second top surfaces 204*c*, 208*c* are spaced from one another. In one example embodiment, the first and second arced surfaces 204*b*, 208*b* in the closed position and the partially circular portion 212 form a complementary shape to the pipe 300. In another example embodiment, responsive to the FES assembly 200 being in the closed position, the first and second top surfaces 204*c*, 208*c* are configured to be coupled together by a coupler 250. In one example embodiment, the coupler 250 is a dart coupler, a screw, a pole, and/or a nail. In one example embodiment, the coupler 250 is manufactured during the FES molding process. In one example embodiment, the coupler 250 includes index fins 250*a* and slots 250*b*. The slots 250 are usable with a pry bar to tighten the first and second hinge arms 204, 206 around the pipe 300.

Figure 6:
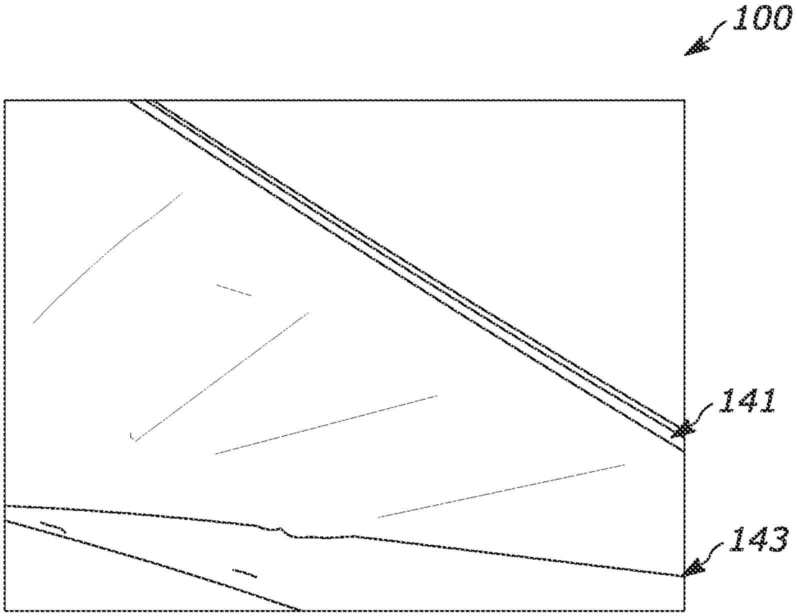
FIG. 6 is a partial sectional-side view of an unformed FES assembly constructed in accordance with the present disclosure.
Figure 7:
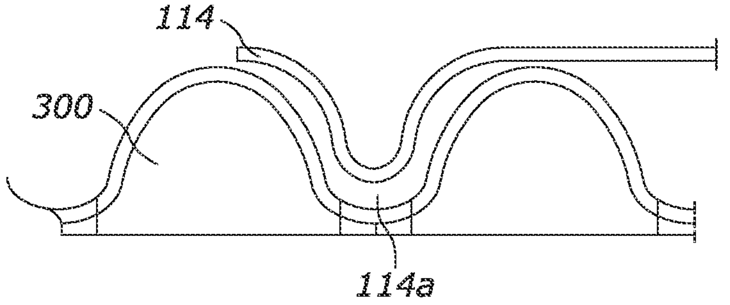
FIG. 7 is a partial sectional-side view of a front portion of a FES assembly in communication with a corrugation in a pipe constructed in accordance with the present disclosure.

As shown in the illustrated example of FIG. 6, reinforcing corrugations are orientated at the angles shown+/−15 degrees, the reinforcing corrugations are formed during manufacturing of the FES assembly 100. Additionally, the FES assembly 100, 200 provides reinforcement at locations that were not previously available due to the typical manufacturing process and the excess stretching of the sheet of plastic due to the need to create a complete or almost complete circular shape (e.g., as in a typical FES assembly). Further, the FES assembly 100, 200 design enables the formation of the coupling base portion 114*a* by avoiding an "under cut" limitation of the traditional manufacturing process. The FES assembly 100, 200 advantageously allows for vertical stacking, thus increasing stacking capacity and reduce shipping cost, reduces material cost by reducing thinning during the thermoforming process, and allows for the formation of the coupling base portion 114*a* by eliminating under cuts during the manufacturing process. Additionally, the FES assembly 100, 200 advantageously enables an additional connection via the coupling base portion 114*a* to attach inlet head wall portion 102 to the pipe 300, and the hinge system (e.g., the first and second folding hinge arms 104, 204, 108, 208 and first and second hinges 106, 110 and/or the first and second living hinges 206, 210) reduces inlet hydraulic efficiency losses through exposure to fluid and/or fluid pressure. Further, the FES assembly 100, 200 advantageously reduces a weight of the FES assembly by allowing a thinner plastic sheet (relative to traditional FES assemblies) to be used in the thermoforming process and creating a FES assembly 100, 200 having more uniform thickness. The thinner plastic sheet improves cycle time allowing for faster production of the FES assembly 100, 200. The hinge system increases shipping density by allowing vertical stacking, and allows for corrugation reinforcement during the thermoforming process thereby giving strength in select areas that are subjected to excessive soil loads.

In the foregoing specification, specific embodiments have been described. However, one of ordinary skill in the art appreciates that various modifications and changes can be made without departing from the scope of the disclosure as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The disclosure is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The complete disclosure of the patents, patent documents, and publications identified herein are incorporated by reference in their entirety as if each were individually incorporated. To the extent there is a conflict or discrepancy between this document and the disclosure in any such incorporated document, this document will control. All documents referred to herein are incorporated by reference in their entireties for all purposes.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications, and variations that fall within the spirit and scope of the appended claims.

What is claimed is:

1. A flared end section (FES) assembly comprising:
- an inlet head wall portion, the inlet head wall portion defining:
  - a base wall spacing and coupling first and second lateral walls;
  - a partially circular portion defined by the first and second lateral walls; and
  - a coupling base portion extending along the base wall;
- a tapered midsection coupled to the inlet head wall portion, the tapered midsection extending from the inlet head wall portion to a flared end section; and
- first and second folding hinge arms hingedly coupled to the tapered midsection, wherein the first and second folding hinge arms define first and second arced surfaces, the first and second hinge arms having an open position and a closed position, wherein in the closed position, the first and second arced surface align with the partially circular portion to define a portion of a circle greater than the partially circular portion.

2. The FES assembly of claim 1, wherein the first and second hinge arms are coupled to the tapered midsection by a living hinge joint.

3. The FES assembly of claim 2, wherein the living hinge joint comprises a bellowed hinge.

4. The FES assembly of claim 1, wherein the first and second hinge arms are coupled to the tapered midsection and the inlet head wall portion by a living hinge joint.

5. The FES assembly of claim 1, wherein the FES assembly is formed by one or more of molding, thermoforming, injection molding, and extruding.

6. The FES assembly of claim 1, further wherein the first and second lateral walls define at least one of ribs or corrugations for providing lateral stiffness while allowing the articulation of the first and second folding hinge arms.

7. The FES assembly of claim 1, wherein the first and second folding hinge arms are hingedly coupled to the tapered midsection by a bellowed hinge, the bellowed hinge comprising a pivot point at one end about which the bellowed hinges rotate.

8. The FES assembly of claim 1, wherein the first and second folding hinge arms define first and second hinge surfaces, the first and second hinge surfaces at least partially coupled to the first and second hinges, the first and second folding hinge arms further defining first and second top surfaces which are configured to be coupled together by a coupler responsive to the FES being in the closed position.

9. The FES assembly of claim 1, wherein the first and second lateral walls are arced where coupled to the tapered midsection and terminate at or near the flared end section.

10. The FES assembly of claim 1, wherein the base wall is substantially linear through the tapered midsection.

11. A flared end section (FES) assembly comprising:
- an inlet head wall portion, the inlet head wall portion defining:
  - a base wall spacing and coupling first and second lateral walls;
  - a partially circular portion defined by the first and second lateral walls; and
  - a coupling base portion extending along the base wall;
- a tapered midsection coupled to the inlet head wall portion, the tapered midsection extending from the inlet head wall portion to a flared end section; and
- a first folding hinge arm hingedly coupled to the tapered midsection, wherein the first folding hinge arm defines a first arced surface, the first folding hinge arm having an open position and a closed position, wherein in the closed position, the first arced surface aligns with the partially circular portion to define a portion of a circle greater than the partially circular portion.

12. The FES assembly of claim 11, a second folding hinge arm hingedly coupled to the tapered midsection, wherein the second folding hinge arm defines a second arced surfaces, the second hinge arm having a second open position and a second closed position, wherein in the second closed position, the second arced surface aligns with the first folding hinge arm and the partially circular portion in the closed position to define a second portion of a circle greater than the portion of the circle formed by the partially circular portion and the first arced surface in the closed position.

13. The FES assembly of claim 11, wherein the first folding hinge arm is coupled to the tapered midsection by a living hinge joint.

14. The FES assembly of claim 13, wherein the living hinge joint comprises a bellowed hinge.

15. The FES assembly of claim 11, wherein the FES assembly is formed by one or more of molding, thermoforming, injection molding, and extruding.

16. The FES assembly of claim 11, further wherein the first lateral wall defines at least one of ribs or corrugations for providing lateral stiffness while allowing the articulation of the first folding hinge arm.

17. The FES assembly of claim 11, wherein the first folding hinge arm is hingedly coupled to the tapered midsection by a bellowed hinge, the bellowed hinge comprising a pivot point at one end about which the bellowed hinge rotate.

18. A method of making a flared end section (FES) assembly, the method comprising:
- forming a polymer into an inlet head wall portion, the inlet head wall portion defining:
  - a base wall spacing and coupling first and second lateral walls;
  - a partially circular portion defined by the first and second lateral walls; and
  - a coupling base portion extending along the base wall;
- forming a tapered midsection coupled to the inlet head wall portion, the tapered midsection extending from the flared end portion to a flared end section; and
- forming first and second folding hinge arms hingedly coupled to the tapered midsection, wherein the first and second folding hinge arms define first and second arced surfaces, the first and second hinge arms having an open position and a closed position, wherein in the closed position, the first and second arced surface align with the partially circular portion to define a portion of a circle greater than the partially circular portion.

19. The method of claim 18, the forming comprising at least one of molding, thermoforming, injection molding, and extruding the polymer to form the FES.

20. The method of claim 18, the forming the first and second folding hinge arms hingedly coupled to the tapered midsection comprising forming a living hinge.

* * * * *